United States Patent
Kilibarda et al.

(10) Patent No.: US 11,316,188 B2
(45) Date of Patent: *Apr. 26, 2022

(54) BATTERY AND PROCESS FOR PRODUCING A BATTERY

(71) Applicant: VARTA Microbattery GmbH, Ellwangen Jagst (DE)

(72) Inventors: Goran Kilibarda, Schwaebisch Gmuend (DE); Bernd Kreidler, Ellwangen (DE); Joachim Rieger, Aalen (DE)

(73) Assignee: VARTA MICROBATTERY GMBH, Ellwangen Jagst (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/850,026

(22) Filed: Apr. 16, 2020

(65) Prior Publication Data

US 2020/0381764 A1 Dec. 3, 2020

(30) Foreign Application Priority Data

May 28, 2019 (EP) .................................. 19176897

(51) Int. Cl.
*H01M 10/04* (2006.01)
*H01M 10/0525* (2010.01)
(Continued)

(52) U.S. Cl.
CPC ... *H01M 10/0427* (2013.01); *H01M 10/0525* (2013.01); *H01M 10/0587* (2013.01);
(Continued)

(58) Field of Classification Search
CPC .... H01M 50/56; H01M 50/109; H01M 50/20; H01M 50/132; H01M 50/15
See application file for complete search history.

(56) References Cited

U.S. PATENT DOCUMENTS 6,468,691 B1 * 10/2002 Malay ................. H01M 50/166
429/174
2002/0182492 A1 * 12/2002 Kimura ............. H01M 10/0585
429/162

(Continued)

FOREIGN PATENT DOCUMENTS

| EP | 3024055 A2 | 5/2016 |
| EP | 3121865 B1 | 12/2017 |

(Continued)

*Primary Examiner* — Kenneth J Douyette
(74) *Attorney, Agent, or Firm* — Leydig, Voit & Mayer, Ltd.

(57) ABSTRACT

A method for producing a battery includes providing a cup-shaped first housing part having a bottom and a side wall, the bottom and the side wall each having an inside and an outside. The method further includes covering the inside of the bottom of the first housing part with an electrically conductive covering, electrically connecting the electrically conductive covering to the bottom of the first housing part by welding, electrically connecting an electric conductor to the electrically conductive covering by welding, and assembling the first housing part and a second housing part to form a housing of the battery, the housing enclosing an interior space that includes a composite body therein. The composite body includes a positive electrode, a negative electrode, a separator, and the electric conductor. The inside of the bottom and the inside of the side wall of the first housing part face the interior space.

16 Claims, 1 Drawing Sheet

(51) Int. Cl.
*H01M 50/56* (2021.01)
*H01M 50/116* (2021.01)
*H01M 10/0587* (2010.01)
*H01M 50/166* (2021.01)
*H01M 50/538* (2021.01)
*H01M 50/124* (2021.01)

(52) U.S. Cl.
CPC ..... *H01M 50/116* (2021.01); *H01M 50/1243* (2021.01); *H01M 50/166* (2021.01); *H01M 50/538* (2021.01); *H01M 50/56* (2021.01)

(56) References Cited

U.S. PATENT DOCUMENTS

| | | | |
|---|---|---|---|
| 2003/0013007 A1* | 1/2003 | Kaun | H01M 10/045 |
| | | | 429/94 |
| 2012/0015224 A1 | 1/2012 | Pytlik et al. | |
| 2012/0100406 A1 | 4/2012 | Gaugler | |
| 2014/0315061 A1 | 10/2014 | Wang | |
| 2015/0140456 A1* | 5/2015 | Allen | H01M 50/109 |
| | | | 429/406 |
| 2016/0141561 A1 | 5/2016 | Watanabe | |
| 2017/0093053 A1* | 3/2017 | Chang | H01M 50/291 |

FOREIGN PATENT DOCUMENTS

| | | | |
|---|---|---|---|
| EP | 3255714 A1 | 12/2017 | |
| WO | WO 2010/089152 A1 | 8/2010 | |
| WO | WO 2010/146154 A2 | 12/2010 | |

* cited by examiner

BATTERY AND PROCESS FOR PRODUCING A BATTERY

CROSS REFERENCE TO RELATED APPLICATIONS

This application claims benefit to European Patent Application No. EP 19176897.7, filed on May 28, 2019, which is hereby incorporated by reference herein.

FIELD

The present disclosure relates to a process for producing a battery and to a battery produced by the process.

BACKGROUND

Button cells usually have a cylindrical housing whose height is equal to its diameter or smaller than the latter. Very different electrochemical systems can be present in the housing. Very widespread cells are cells based on zinc/air, zinc/$MnO_2$ and nickel/zinc. Secondary systems are also very widespread. Examples of these are nickel/metal hydride systems, nickel/cadmium systems and lithium ion systems.

Classically, the housing of button cells generally consists of two solid, metallic housing parts between which an electrically insulating seal is arranged. One of the housing parts is electrically connected to the positive electrode and is accordingly positively poled. The other is electrically connected to the negative electrode and is accordingly negatively poled. The seal is intended to prevent electric contact between the oppositely poled housing parts. In addition, it should counter escape and also intrusion of liquid or moisture from or into the housing. The housing parts are usually made of nickel-clad steel or of stainless steel.

In the case of a button cell based on lithium ions, the housing in many cases contains a composite body in the form of a cell stack which consists of a plurality of single cells. The cells often also contain a rolled composite body which is generally a single cell in rolled form. Button cells having rolled composite bodies based on lithium ions are described, for example, in In the composite bodies, positive and negative electrodes and also separators are generally present in areal contact with one another. The electrodes and separators are, for example, usually joined to one another by lamination or by adhesive bonding. In general, composite bodies, regardless of whether they are rolled or not, comprise the sequence positive electrode/separator/negative electrode. As bicells, composite bodies are frequently produced with the possible sequences negative electrode/separator/positive electrode/separator/negative electrode or positive electrode/separator/negative electrode/separator/positive electrode.

The electrodes in the composite bodies usually in each case comprise a metallic current collector and also electrochemically active components and electrochemically inactive components.

The current collectors serve to establish electric contact over as large as possible an area with the electrochemically active components. They usually consist of tape-like, areal metallic substrates, for example metal foils or a metal sponge or a metallized nonwoven. In the case of cells based on lithium ions, the negative electrodes usually have a current collector composed of copper or of a copper alloy. The positive electrodes of cells based on lithium ions usually have a current collector composed of aluminium or of an aluminium alloy.

All materials which can take up lithium ions and release them again come into question as active materials for secondary lithium ion systems. Prior art materials for the negative electrode of secondary lithium ion systems are, in particular, materials based on carbon, for example graphitic carbon, or nongraphitic carbon materials capable of intercalating lithium. Possibilities for the positive electrode of secondary lithium ion systems are, for example, lithium-metal oxide compounds and lithium-metal phosphate compounds such as $LiCoO_2$ and $LiFePO_4$.

As electrochemically inactive components, mention may be made first and foremost of electrode binders and conductive materials. The electrode binders ensure the mechanical stability of the electrodes and ensure contact of the particles of electrochemically active material with one another and also with the current collector. Conductive materials such as carbon black serve to increase the electrical conductivity of the electrodes.

Possible separators for the abovementioned composite bodies are, in particular, tapes composed of porous polymer films, for example composed of a polyolefin or of a polyether ketone. Nonwovens and woven fabrics, in particular composed of these materials, can also be used.

End sections of the current collectors or electric conductors welded onto the current collectors can serve to establish electrical contact between the electrodes and the housing parts of a button cell housing. In the case of button cells, the positive electrodes of the composite bodies are to be electrically connected to one of the two abovementioned housing parts of a button cell housing, and negative electrodes to the other of the housing parts.

The housing parts of a button cell generally have a circular or oval bottom. In most cases, preference is given to joining the current collectors or the electric conductors welded thereto to this bottom, in particular welding them to this bottom. This is not always unproblematic. Welded joins between different metals are sometimes difficult to form and electrochemically unstable. Consequently, process fluctuations and thus rejects can occur.

EP 3 121 865 B1 discloses covering the bottom of a housing part with a thin aluminium disc in button cells and welding the end section of a current collector composed of aluminium not directly to the housing bottom but to the aluminium disc. This is disadvantageous in so far the introduction of the aluminium disc increases on average the internal resistance of the button cells.

SUMMARY

In an embodiment, the present invention provides a method for producing a battery. The method includes providing a cup-shaped first housing part having a circular or oval bottom and a ring-shaped side wall, the bottom and the ring-shaped side wall each having an inside and an outside. The method further includes covering the inside of the bottom of the cup-shaped first housing part with an electrically conductive covering, electrically connecting the electrically conductive covering to the bottom of the cup-shaped first housing part by welding, electrically connecting an electric conductor to the electrically conductive covering by welding, and assembling the cup-shaped first housing part and a second housing part to form a housing of the battery, the housing enclosing an interior space that includes a composite body therein. The composite body includes a positive electrode, a negative electrode, a separator, and the electric conductor. The cup-shaped first housing part and the second housing part are metallic. The inside of the bottom and the inside of the side wall of the cup-shaped first housing part face the interior space. The outside of the bottom and the outside of the side wall of the cup-shaped first housing part face in a direction opposite the interior space. The electric conductor electrically connects the positive electrode or the negative electrode to the cup-shaped first housing part.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
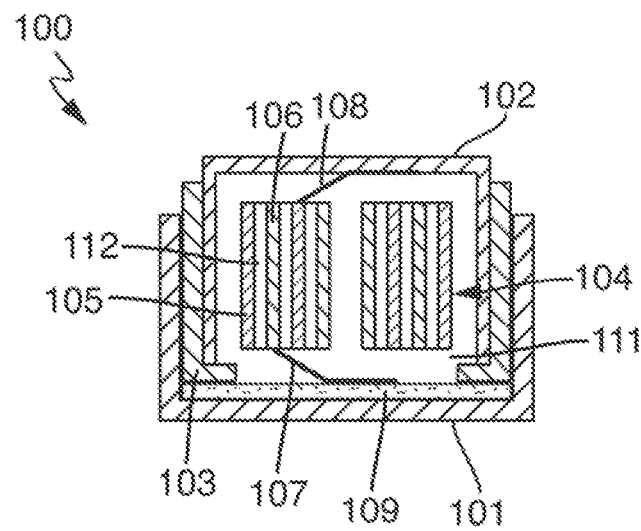
FIGS. 1A through 1D illustrate an embodiment of a battery in cross section and components used in assembly of the battery.
Figure 1B:
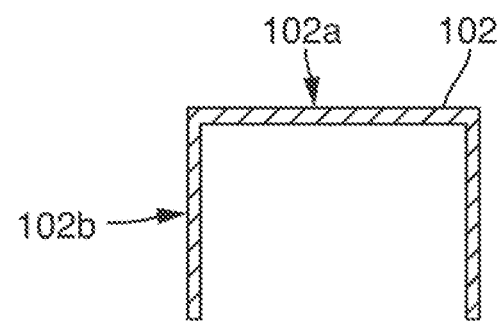

The present disclosure describes improved solutions for the electrical contacting of the electrodes of a battery with one of their housing parts.

A process according to the present disclosure is employed for producing a battery which has the following features:
   a. it comprises a housing enclosing an interior space,
   b. it comprises a composite body which is arranged in the interior space and is made up of at least one positive electrode, at least one negative electrode and at least one separator,
   c. the housing comprises a metallic, cup-shaped first housing part and a metallic second housing part,
   d. the cup-shaped first housing part comprises a circular or oval bottom,
   e. the cup-shaped first housing part comprises a ring-shaped side wall,
   f. the bottom and the side wall of the cup-shaped first housing part each have an inside facing the interior space and an outside facing in the opposite direction, and
   g. the composite body comprises an electric conductor which electrically connects the at least one positive electrode or the at least one negative electrode to the cup-shaped first housing part.

The process comprises the following steps:
   h. covering the inside of the bottom of the cup-shaped first housing part with an electrically conductive covering,
   i. electrically connecting the covering to the bottom by welding,
   j. electrically connecting the electric conductor to the covering by welding, and
   k. assembling the first housing part and the second housing part to form the housing of the battery with inclusion of the composite body in the interior space.

It has been found that the above mentioned problem of the increased internal resistance no longer occurs when the welded covering is present. In addition, the welding also allows the bottom of the housing part to be screened, at least in a subregion, so that it can no longer come into contact with electrolyte which may be present in the interior space. This can significantly increase the electrochemical resistance of the housing of the battery.

The housings and the housing parts of the battery, namely the cup-shaped first housing part and the second housing part, can, for example, be configured like the housing parts of the cell depicted in FIG. 1 of WO 2010/146154 A2. The battery can thus also be, in particular, a button cell. However, the battery can, for example, also be a cylindrical round cell, i.e. have a height which is greater than its diameter.

A ring-shaped seal composed of polymer, which electrically insulates the housing parts from one another, is usually arranged between the two metallic housing parts. In addition, the seal should ensure liquid-tight closure of the housing.

The housing parts preferably consist of a steel, in particular a nickel-plated steel. In the latter case, the outside of the first housing part in particular and optionally also of the second housing part is/are nickel-plated. Furthermore, trimetal, for example with the sequence nickel, steel and copper, is also possible as metallic material.

The second housing part is particularly preferably configured with a cup shape like the first housing part, i.e. likewise has a circular or oval bottom and a ring-shaped side wall. In a further development, preference is given both in the case of the first housing part and in the case of the second housing part to the bottom and the ring-shaped side wall being joined to one another by means of a transition region.

The transition regions preferably comprise the regions of the housing parts which lie outside the plane of the respective bottom but are not yet part of the associated side wall region. The transition regions can be made rounded, for example shoulder-like, or else have the shape of a sharp edge.

The transition regions adjoin the side walls in each case in the direction of the bottoms. On the other side, the side walls are in both cases preferably bounded by a circumferential free edge which defines a circular or oval opening.

The ring-shaped side walls of the housing parts have a cylindrical geometry in preferred embodiments. The side walls can particularly preferably include in each case an angle of 90° with the bottoms.

The basic structure of the composite body arranged in the interior space does not have to differ from composite bodies known from the prior art. Like the composite bodies mentioned at the outset, it consists of electrodes and at least one separator. In the case of a rolled composite body, the composite body can have, for example, a cylindrical or hollow-cylindrical geometry, for instance like the rolled composite bodies depicted in FIGS. 3a and 3b of WO 2010/146154 A2. The roll is then made of tape-like electrodes and at least one tape-like separator.

The composite body preferably comprises electrodes with the current collectors mentioned at the outset. These are preferably in each case a foil, a gauze, a mesh, a foam, a nonwoven or another textile structure composed of a metal or a metal alloy.

The current collectors preferably have at least one section which is not covered with an active material. This section can, in preferred embodiments, serve directly as electric conductor which electrically connects the at least one positive electrode or the at least one negative electrode to the cup-shaped first housing part. As an alternative, the electric conductor can also be a separate conductor which is, for example, welded to the section of the current collector which is not covered with the active material. In the latter case, the electric conductor is preferably a metal foil.

The composite body particularly preferably comprises an electric conductor which electrically connects the at least one positive electrode to the cup-shaped first housing part and an electric conductor which electrically connects the at least one negative electrode to the second housing part.

As an alternative, it can also be preferred that the composite body comprises an electric conductor which electrically connects the at least one negative electrode to the cup-shaped first housing part and an electric conductor which electrically connects the at least one positive electrode to the second housing part.

When both housing parts have a cup-like shape, the assembly of the first and second housing parts is preferably effected by pushing the second housing part with the free edge of its side wall at the front into the first housing part, so that the ring-shaped side wall of the first housing part and the ring-shaped side wall of the second housing part overlap at least in regions and form a circumferential, double-walled side wall and the bottoms of the first and second housing parts are oriented parallel to one another. As an alternative, the first housing part with the free edge of its side wall at the front can also be pushed into the second housing part, so that the ring-shaped side wall of the second housing part and the ring-shaped side wall of the first housing part overlap at least in regions and form a circumferential, double-walled side wall and the bottoms of the second housing part and of the first housing part are oriented parallel to one another.

The dimensions of the first housing part and of the second housing part have to be appropriately matched to one another. The housing part which is to be pushed into the other usually has a side wall having a smaller diameter than the other housing part. The abovementioned ring-shaped seal composed of polymer is usually also pushed onto the side wall having the smaller diameter before the housing parts are assembled. Preferably, the composite body is positioned in the housing part having the smaller side wall before the housing parts are assembled.

To close the housing, the free circumferential edge of the larger housing part can, in some embodiments, be bent inwards his order to generate a form fit. However, crimping-free closure as is depicted, for example, in FIG. 1 of WO 2010/146154 A2 is also fundamentally possible.

The welding of the covering to the bottom of the cup-shaped first housing part can, in particular, be effected by means of resistance welding, by means of ultrasonic welding or by means of laser welding.

In an analogous way, the welding of the covering to the electric conductor of the composite body can, in particular, be effected by means of resistance welding, by means of ultrasonic welding or by means of laser welding.

The welded connection between the covering and the electric conductor and also the bottom can be ensured by means of welded dots and/or welded lines.

In a preferred further development, the process is characterized by at least one of the features a. to c. which directly follow:
  a. The covering used comprises aluminium, chromium, tin or an alloy of these elements as electrically conductive component.
  b. The covering used consists of the aluminium, the chromium, the tin or the alloy of these elements.
  c. The covering used comprises a core composed of a polymer and a metallic coating in particular a coating composed of the aluminium, the chromium, the tin or the alloy of these elements.

The features a. and c. which directly follow are particularly preferably realized in combination with one another. It is thus possible in preferred embodiments for both the covering used being exclusively metallic in nature or for the covering used to have a polymer core which is coated with a metallic coating, preferably completely coated with the coating.

In a preferred further development, the process is characterized by at least one of the features a. to c. which directly follow:
  a. The covering used covers the bottom in regions or in its entirety,
  b. The covering used is configured as disc.
  c. The covering used is configured in such a way that it shields the bottom from electrolyte present in the interior space.

The covering used is particularly preferably configured as disc and completely covers the bottom, so that it can bring about shielding of the bottom from the electrolyte present in the interior space. If the welded connection between the covering and the bottom is ensured by means of a circumferential welded seam along the periphery of the disc, this makes the abovementioned hermetic shielding of the bottom possible.

In preferred embodiments, the disc has a diameter in the range from 3 mm to 20 mm.

In further preferred embodiments, the disc has a thickness in the range from 10 µm to 1 mm, preferably in the range from 100 µm to 300 µm.

When the disc comprises the core of polymer and the metallic coating, the metallic coating preferably has a thickness in the range from 100 nm to 100 µm.

In a first particularly preferred further development, the process is characterized by at least one of the features a. and b. which directly follow, in some particularly preferred embodiments also by a combination of the two features:
  a. The electrical connection of the electric conductor with the covering by welding is carried out before covering of the bottom with the electrically conductive covering.
  b. The electrical connection of the covering with the bottom by welding is carried out after assembly of the first housing part and the second housing part to form the housing of the battery.

In this variant, for example, a cylindrical rolled composite body comprising an electric conductor which is electrically connected to a positive electrode and an electric conductor which is electrically connected to a negative electrode, both electric conductors in the form of a metal foil can be used as composite bodies.

To produce the electrical connection between the electric conductor and the covering, one of the electric conductors can be welded to a metal disc serving as covering, which metal disc is attached to one of the two end faces of the rolled composite body, for example by ultrasonic welding. The rolled composite body can then be pushed with this end face at the front into the cup-shaped first housing part until the metal disc lies flat on the bottom of the first housing part.

After assembly of the housing, welding of the covering to the bottom from the outside can then, for example, be carried out, as is described in WO 2010/146154 A2. Welding processes which can be used are, in particular, laser welding or resistance welding.

In a second particularly preferred further development, the process is characterized by at least one of the features a. and b. which directly follow, in some particularly preferred embodiments also by a combination of the two features:
  a. The electrical connection of the electric conductor with the covering by welding is carried out after covering of the bottom with the electrically conductive covering.

b. The electrical connection of the covering with the bottom by welding is carried out after assembly of the first housing part and the second housing part to form the housing of the battery.

In this variant, it is possible to use, likewise, a rolled composite body having a hollow-cylindrical geometry, i.e. having a central, axial, cylindrical hollow space, which composite body comprises an electric conductor electrically connected to a positive electrode and an electric conductor electrically connected to a negative electrode, in each case in the form of a metal foil, as composite body.

To produce the electrical connection between the electric conductor and the covering, one of the metal foils, for example that connected to the positive electrode, can be laid flat on one of the two end faces. After laying the metal disc flat on the bottom of the first housing part, the rolled composite body can be pushed with these end faces at the front into the cup-shaped first housing part until the metal foil laid thereon lies flat against the metal disc. One or more welded electrodes can then be pushed through the axially oriented hollow space until they press the metal foil against the metal disc. To produce a welded connection between the metal foil and the metal disc, a welding current can be passed through the welding electrodes into the metal foil. As an alternative, the metal foil can, for example, be welded by means of a laser beam through the axially oriented hollow space or by means of a laser beam produced in the axially oriented hollow space to the metal disc.

After assembly of the housing, welding of the covering to the bottom from the outside can, for example, then be carried out, as is described in WO 2010/146154 A2. Here too, laser welding or resistance welding, in particular, can be used as welding processes.

In a third particularly preferred development, the process is characterized by at least one of the features a. and b. which directly follow, in some particularly preferred embodiments also by a combination of the two features:
 a. The electrical connection of the electric conductor with the covering by welding is carried out after covering of the bottom with the electrically conductive covering.
 b. The electrical connection of the covering with the bottom by welding is carried out before assembly of the first housing part and the second housing part to form the housing of the battery.

In this variant, it is possible to use, for likewise, a rolled composite body having a hollow-cylindrical geometry, i.e. having a central, axial, cylindrical hollow space, which composite body comprises an electric conductor electrically connected to a positive electrode and an electric conductor electrically connected to a negative electrode, in each case in the form of a metal foil, as composite body.

To produce the electrical connection between the electric conductor and the covering, one of the metal foils, for example that connected to the positive electrode, can be laid flat on one of the two end faces. After laying the metal disc flat on the bottom of the first housing part, the rolled composite body can be pushed with these end faces at the front into the cup-shaped first housing part until the metal foil laid thereon lies flat against the metal disc. One or more welded electrodes can then be pushed through the axially oriented hollow space until they press the metal foil against the metal disc. To produce a welded connection between the metal foil and the metal disc, a welding current can be passed through the welding electrodes into the metal foil. As an alternative, the metal foil can be welded by means of a laser beam through the axially oriented hollow space or by means of a laser beam produced in the axially oriented hollow space to the metal disc.

Even before assembly of the housing, welding of the covering to the bottom from the outside can, for example, then be carried out, as is described in WO 2010/146154 A2. Here too, it is possible to use, in particular, laser welding or resistance welding as welding processes. The first housing part and the second housing part can subsequently be assembled to form the housing.

In a fourth particularly preferred further development, the process is characterized by at least one of the features a. and b. which directly follow, in some particularly preferred embodiments also by a combination of the two features:
 a. The electrical connection of the electric conductor with the covering by welding is carried out after covering of the bottom with the electrically conductive covering.
 b. The electrical connection of the covering with the bottom by welding and the electrical connection of the covering to the bottom by welding are carried out simultaneously.

In this variant, it is possible to use, for example, a rolled composite body having a hollow-cylindrical geometry, i.e. having a central, axial, cylindrical hollow space, which composite body likewise comprises an electric conductor electrically connected to a positive electrode and an electric conductor electrically connected to a negative electrode, in each case in the form of a metal foil, as composite body.

To produce the electrical connection between the electric conductor and the covering, one of the metal foils, for example that connected to the positive electrode, can be laid flat on one of the two end faces. After laying the metal disc flat on the bottom of the first housing part, the rolled composite body can be pushed with these end faces at the front into the cup-shaped first housing part until the metal foil laid thereon lies flat against the metal disc. One or more welded electrodes can then be pushed through the axially oriented hollow space until they press the metal foil against the metal disc. To produce a welded connection between the metal foil and the metal disc and between the metal disc and the bottom of the first housing part, a welding current is passed through the welding electrodes into the metal foil. As an alternative, the welding can be carried out by means of a laser beam through the axially oriented hollow space or by means of a laser beam produced in the axially oriented hollow space.

For welding by means of welding electrodes, it is possible to use two or more welding electrodes pushed through the axially oriented hollow space. As an alternative, one welding electrode can also be pushed through the hollow space while at least one further welding electrode is positioned on the outside of the bottom of the first housing part. In this case, the welding current flows through the first housing part.

A battery according to the present disclosure results directly from the above-described process. It is accordingly characterized by the following features:
 a. it comprises a housing enclosing an interior space,
 b. it comprises a composite body which is arranged in the interior space and is made up of at least one positive electrode, at least one negative electrode and at least one separator,
 c. the housing comprises a metallic, cup-shaped first housing part and a metallic second housing part,
 d. the cup-shaped first housing part comprises a circular or oval bottom,
 e. the cup-shaped first housing part comprises a ring-shaped side wall, f. the bottom and the side wall of the cup-shaped first housing part each have an inside facing the interior space and an outside facing in the opposite direction, and g. the composite body comprises an electric conductor which electrically connects the at least one positive electrode or the at least one negative electrode to the cup-shaped first housing part.

In particular, the battery is characterized in that:

h. the inside of the bottom of the cup-shaped first housing part is covered with an electrically conductive covering, i. the covering is electrically connected to the bottom by welding, and j. the electric conductor is electrically connected to the covering by welding.

As regards preferred embodiments of the components of the battery, reference is made to the explanations in connection with the process described. Regardless of these, some particularly preferred features of the battery will be set forth again below, namely that:

the composite body preferably comprises the electrodes in stacked form or in rolled form, and/or that the electrodes are configured so as to be able to incorporate and release lithium ions releasably, and/or that the electrodes each preferably comprise a current collector which is partly covered with an active material and/or that the electric conductor is preferably a part of the current collector which is not covered with the active material, and/or that at least the cup-shaped first housing part preferably consists of steel or stainless steel and/or that the outside of the first cup-shaped housing part is preferably covered with a layer of nickel, and/or that the second housing part preferably has a cup-shaped configuration like the first housing part and/or the battery is preferably a button cell.

In the past, the term battery has been used exclusively to refer to a plurality of electrochemical cells connected in series in a housing. However, single electrochemical cells are frequently also referred to as batteries today. This interpretation should also be applied in the present case. Even a button cell having only one positive electrode and one negative electrode will be referred to as battery for the purposes of the present patent application.

The battery is preferably a cylindrical button cell having an underside which is circular at least in one subregion and a upper side which is circular at least in a subregion and a ring-shaped side wall located inbetween. The distance between the upper side and the underside is preferably in the range from 4 mm to 15 mm. The maximum distance between two points on the side wall of the button cell is here preferably in the range from 5 mm to 25 mm. This is subject to the proviso that the maximum distance between the two points on the side wall is greater than the distance between upper side and the underside.

In further preferred embodiments, the battery is a cylindrical round cell having a housing with an underside which is circular and an upper side which is circular and a cylindrical side wall located inbetween. The distance between the upper side and the underside is preferably in the range from 10 mm to 100 mm. The maximum distance between two points on the side wall of the round cell is here preferably in the range from 5 mm to 20 mm. This is subject to the proviso that the maximum distance between the two points on the side wall is less than the distance between the upper side and the underside.

The nominal capacity of the battery is generally not more than 10000 mAh, in particular not more than 5000 mAh, in particular in the case that the battery is a cylindrical round cell. In the case of a button cell, the nominal capacity is preferably in the range from 50 mAh to 1000 mAh, particularly preferably in the range from 50 to 800 mAh.

In the European Union, manufacturers' indications concerning the nominal capacities of secondary batteries are strictly regulated. Thus, for instance, indications of nominal capacity of secondary nickel-cadmium batteries have to be based on measurements in accordance with the standards IEC/EN 61951-1 and IEC/EN 60622, indications of nominal capacity of secondary nickel-metal hydride batteries have to be based on measurements in accordance with the standard IEC/EN 61951-2, indications of the nominal capacity of secondary lithium ion batteries have to be based on measurements in accordance with the standard IEC/EN 61960 and indications of the nominal capacity of secondary lead-acid batteries have to be based on measurements in accordance with the standard IEC/EN 61056-1. All indications of nominal capacities in the present application are preferably likewise based on these standards.

Particularly when the battery is a rechargeable lithium ion battery, the battery is preferably characterized by at least one of the features a. to c. which follow directly:

a. The first housing part is electrically connected to the at least one positive electrode.

b. The electric conductor consists of aluminium or of an aluminium alloy.

c. The covering used consists of aluminium or of an aluminium alloy.

The features a. to c. directly above are particularly preferably realized in combination with one another.

The electric conductor is ideally based on the same metal as the current collector to which it is connected. In the case of lithium ion batteries, current collectors of the positive electrode frequently consist of aluminium or an aluminium alloy, while current collectors for the negative electrode preferably consist of copper or a copper alloy.

Further features, details and preferred aspects of the invention may be derived from the following description of preferred embodiments and also with the aid of the drawings.

The button cell 100 with the features depicted in FIG. 1A has a housing which is made up of the first housing part 101 and the second housing part 102. The two housing parts 101 and 102 consist of steel. They are both cup-shaped. The housing part 101 comprises the circular bottom 101a and the ring-shaped side wall 101b. The housing part 102 comprises the circular bottom 102a and the ring-shaped side wall 102b.

The seal 103 is arranged between the housing parts 101 and 102 and seals the housing. The housing encloses an interior space 111 in which the composite body 104 is arranged. This is made of the negative electrode 105, the positive electrode 106 and the separator 112 and is present as roll. The end faces of the roll point in the direction of the bottoms 101a and 102a.

The electrodes 105 and 106 each comprise a current collector which is predominantly covered with an active material and is therefore also not visible in large parts, apart from the subregions 107 and 108 which are not covered with active material. The subregions 107 and 108 function as electric conductors in the present case. The electric conductor 107 connects the positive electrode 106 to the cup-shaped first housing part 101. The negative electrode 105 is connected via the electric conductor 108 to the second housing part 102. The current collector for the negative electrode 105 and thus the electric conductor 108 is a copper foil. The current collector for the positive electrode 106 and thus the electric conductor 107 is an aluminium foil.

The side of the bottom 101a of the housing part 101 which faces the interior space 111 is covered with the metal disc 109 which consists of aluminium and functions as electrically conductive covering. The metal disc 109 is welded at its periphery by means of a welded join, for example a circular welded seam, to the bottom 101a. The metal disc 109 is configured in such a way that it shields the bottom 101a from electrolyte present in the interior space 111.

The electric conductor 107 is likewise joined to the metal disc 109 by welding. The electric conductor 108 is connected to the inside of the bottom 102a of the housing part 102, likewise by welding.

Figure 1C:
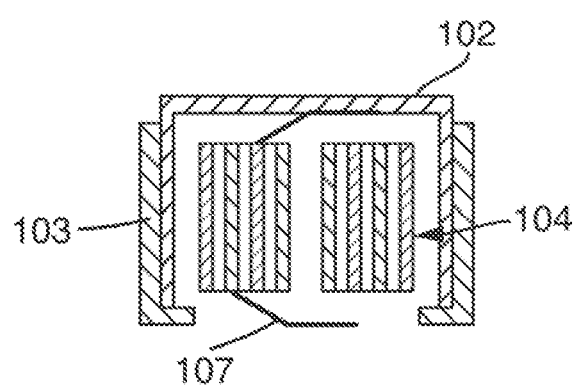
Figure 1D:
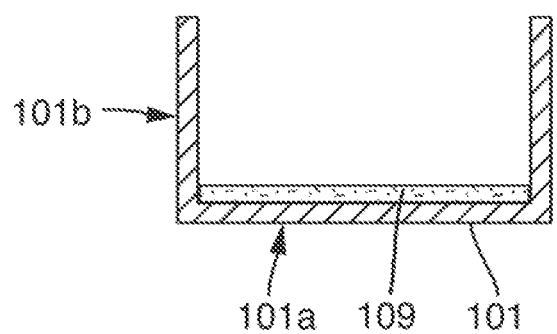

To assemble the button cell 100, the latter is assembled from the housing part 101 provided with the inlaid aluminium disc 109 (depicted in FIG. 1D), the housing part 102 (depicted in FIG. 1B) and the composite body 104 (depicted in FIG. 1C). The composite body 104 is for this purpose pushed into the housing part 102, and the seal 103 is pulled onto the side wall 102b. The preassembled ensemble made up of the housing part 102, the composite body 104 and the seal 103 is subsequently pushed into the housing part 101, and the housing is closed. The aluminium disc 109 has preferably already been welded to the inside of the bottom 101a of the housing part 101 during assembly. However, this can in principle also occur only later, see below.

The welding of the electric conductor 108 to the inside of the bottom 102a is preferably carried out before the preassembled ensemble is pushed into the housing part 101. For example, a welding electrode can for this purpose be conducted through the centre of the composite body 104 and the electric conductor 108 can be fixed to the inside of the bottom 102a by resistance welding. When the electric conductor 108 is sufficiently long, it can also be welded to the bottom 102a before the composite body 104 is pushed into the housing part 102. Otherwise, it is in principle also possible to carry out welding after pushing-in of the composite body 104 or even after closure of the housing, in a manner analogous to the procedure described in WO 2010/146154 A2.

The welding of the electric conductor 107 to the metal disc 109 can in principle likewise be carried out after closure of the housing, e.g. likewise in a manner analogous to the procedure described in WO 2010/146154 A2. For example, welding of the electric conductor 107 to the metal disc 109 and the metal disc 109 to the inside of the bottom 101a can be carried out simultaneously by means of a laser. However, when the electric conductor 108 is sufficiently long, it can also be welded to the metal disc 109 before closure of the housing.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A battery, comprising:
    a housing enclosing an interior space, the housing including a metallic cup-shaped first housing part and a metallic second housing part, the cup-shaped first housing part including a circular or oval bottom and a ring-shaped side wall, the bottom and the ring-shaped side wall of the cup-shaped first housing part each having an inside and an outside;
    a composite body arranged in the interior space, the composite body including a positive electrode, a negative electrode, a separator, and an electric conductor electrically connected to the positive electrode or the negative electrode; and
    an electrically conductive covering that covers the inside of the bottom of the cup-shaped first housing part, the electrically conductive covering being welded to the bottom of the cup-shaped first housing part and to the electric conductor,
    wherein the inside of the bottom and the inside of the side wall of the cup-shaped first housing part face the interior space of the housing and
    wherein the outside of the bottom and the outside of the side wall of the cup-shaped first housing part face in a direction opposite the interior space of the housing.

2. The battery according to claim 1, wherein the composite body comprises the electrodes in stacked form or in rolled form, and
    wherein the electrodes are configured to reversibly incorporate and release lithium ions.

3. The battery according to claim 1, wherein the cup-shaped first housing part is electrically connected to the positive electrode,
    wherein the electric conductor includes aluminium or an aluminium alloy, and
    wherein the electrically conductive covering includes aluminium or an aluminium alloy.

4. The battery according to claim 1, wherein the electrodes each include a current collector which is partly covered with a respective active material, and
    wherein the electric conductor is a part of a respective current collector which is not covered with the corresponding respective active material.

5. The battery according to claim 1, wherein the cup-shaped first housing part includes steel or stainless steel, and
    wherein the outside of the cup-shaped first housing part is covered with a layer of nickel.

6. The battery according to claim 1, wherein the second housing part has a cup-shaped configuration, and
    wherein the battery is a button cell.

7. The battery according to claim 1, wherein the electrically conductive covering comprises aluminium, chromium, tin, or an alloy of aluminium, chromium, and/or tin.

8. The battery according to claim 1, wherein the electrically conductive covering consists of aluminium, chromium, tin, or an alloy of aluminium, chromium, and/or tin.

9. The battery according to claim 1, wherein the electrically conductive covering comprises a polymer core coated with aluminium, chromium, tin, and/or an alloy of aluminium, chromium, and/or tin.

10. The battery according to claim 1, wherein the electrically conductive covering is a disc.

11. The battery according to claim 10, wherein the electrically conductive covering is welded to the bottom of the cup-shaped first housing part via a circumferential weld seam extending along a periphery of the disc.

12. The battery according to claim 11, wherein the electrically conductive covering is configured to hermetically shield the bottom of the cup-shaped first housing part from electrolyte present in the interior space.

13. The battery according to claim 12, wherein the electrically conductive covering completely covers the bottom of the cup-shaped first housing part.

14. The battery according to claim 10, wherein the disc is a circular or oval disc that completely covers the bottom of the cup-shaped first housing part.

15. The battery according to claim 1, wherein the electrically conductive covering is welded to the bottom of the cup-shaped first housing part via a resistance welded joint, an ultrasonic welded joint, and/or a laser welded joint.

16. The battery according to claim 15, wherein the electrically conductive covering is welded to the electric conductor via a resistance welded joint, an ultrasonic welded joint, and/or a laser welded joint.

\* \* \* \* \*